Jan. 5, 1932.    M. W. MORGAN    1,839,799
VERTICAL FLEXIBLE COUPLING
Filed Nov. 30, 1927
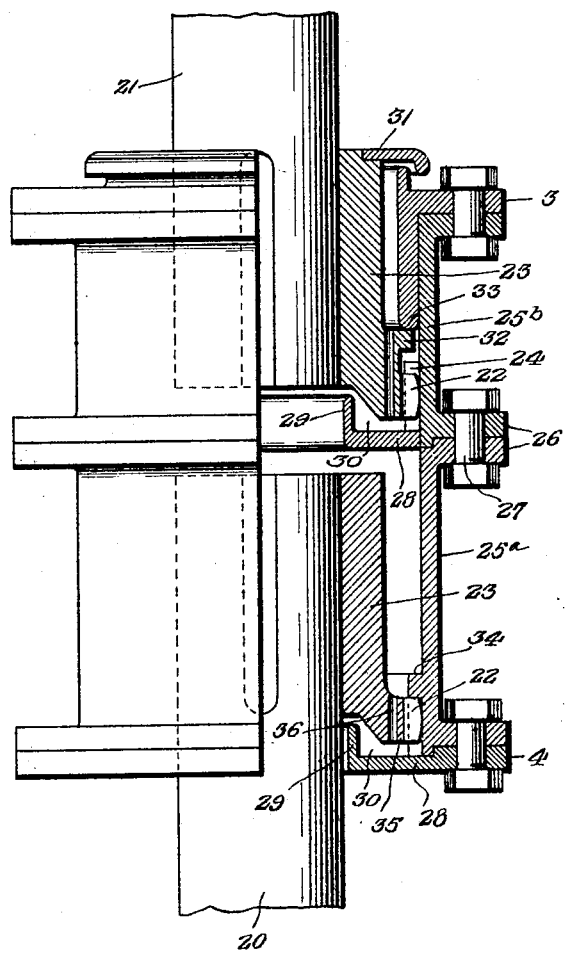
INVENTOR.
M. W. Morgan,
BY
his ATTORNEYS Patented Jan. 5, 1932

1,839,799

UNITED STATES PATENT OFFICE

MERTON W. MORGAN, OF BALTIMORE, MARYLAND, ASSIGNOR TO POOLE ENGINEERING AND MACHINE COMPANY, OF BALTIMORE, MARYLAND, A CORPORATION OF MARYLAND

VERTICAL FLEXIBLE COUPLING

Application filed November 30, 1927. Serial No. 236,798.

This invention relates to improvements in flexible shaft couplings and particularly to a flexible coupling for vertically disposed shafts.

One object of the invention is to flexibly support the coupling member, preferably a sleeve connecting the two shafts, in such fashion that said sleeve is free to rock and assume various positions wherein it will compensate for angular misalinement or parallel offset misalinement of the shafts.

In the preferred type of coupling, the two shafts are each provided with a series of teeth meshing with teeth on the connecting sleeve. A further object of the invention is to secure proper lubrication of these interlocking teeth. More specifically, this lubrication is obtained by the provision of lubricant reservoirs so located within the coupling sleeve that lubricant therein will be caused to spread in a film on the interior of the sleeve by centrifugal force created by the shafts when rotated. This film would, of course, normally spread the entire length of the sleeve and be comparatively thin, due to the limitations necessarily imposed on the size of said reservoirs. For this reason the present invention also contemplates the provision of means for limiting the area of the lubricant film so as to build up the depth or thickness thereof whereby a more complete immersion of the teeth is obtained than would ordinarily be secured.

To facilitate application of the sleeve to the shafts, and its removal therefrom, said sleeve is composed of a plurality of sections capable of being detachably connected together when assembled on the shafts. The sleeve sections are also provided with exterior plane parallel surfaces and another object is to provide means for separately supporting the sections on the shafts before they are connected together whereby the alinement or misalinement of said shafts may be determined by the application of a straight edge or similar instrument to the exterior plane parallel surfaces of the sleeve sections.

With these and other objects in view the invention consists in certain novel details of construction, and combinations and arrangements of parts, all as will hereinafter be more fully described the novel features thereof being particularly pointed out in the appended claims.

In the accompanying drawing, the coupling is shown in cross section, longitudinally of the shafts which, in use, are adapted to be vertically disposed.

The coupling illustrated is of the general construction disclosed in applicant's Patent No. 1,535,621, dated April 28, 1925, wherein each of the two shafts 20, 21 are provided with a series of teeth 22, said teeth being preferably formed on hubs 23 keyed or otherwise firmly secured on the juxtaposed ends of the shafts. Teeth 22 mesh with teeth 24 on the interior of a coupling sleeve through which power is transmitted from one shaft to the other. To facilitate assembly of said coupling sleeve on the shafts and its removal therefrom, said sleeve is usually composed of a plurality of sections such as indicated at 25a, 25b, each section having one of the sets of teeth 24 formed thereon. Not infrequently the two shafts become misalined and to compensate for such misalinement, whether it be angular or offset parallel misalinement, the sleeve is given a rocking bearing on the teeth 22 by having the latter formed with curved crowns. Sections 25a, 25b of the sleeve are formed with flanges 26 and when said parts are assembled on the shafts they are connected by bolts 27 extending through said flanges.

In the present instance, the shafts together with the coupling sleeve are adapted to be vertically disposed under which circumstances special means must be provided for retaining lubricant in said sleeve for lubricating the various parts. This is accomplished by the provision of a reservoir on each sleeve section so located that lubricant held therein will be caused to spread in a film on the wall of the sleeve by centrifugal force created by the rotating shafts. Preferably these reservoirs are formed by an inward, radially extending flange 28 on each sleeve section, the inner edge of said flange having an upturned flange 29, thereby forming an annular trough 30 in the sleeve section into which the teeth partially project. Members 28 may be secured to the sleeve either by welding or by bolts, the latter form of fastening being preferred. Lubricant is introduced into the sleeve by lifting cover plate 31 at the upper end of the hub on shaft 21, the lubricant being poured in until a sufficient quantity overflows flange 29 of the upper reservoir to fill the reservoir or trough in lower sleeve section 25a. The hubs 23 are formed with ducts 36 to facilitate the flow of lubricant.

To support the assembled sleeve sections 25a, 25b on the shafts the hub of shaft 21 is formed with a shoulder or ledge 32 and sleeve section 25b has an interior shoulder or flange 33 adapted to bear on shoulder 32. One of these shoulders, preferably shoulder 33 on said sleeve section, has a rounded bearing surface whereby the entire sleeve may rock as in the case of its bearing on the curved crowns of teeth 22. When the two sleeve sections are being assembled on the shafts, the latter must be lined up. To facilitate the operator determining the alinement of said shafts, the flanges 26 of the sleeve sections are formed with plane parallel surfaces and the sleeve sections are adapted to be separately supported in spaced relation on the two shafts with said sections centered thereon by their engagement with teeth 22. Section 25b is supported on shaft 21 by shoulders 32, 33 and section 25a is supported by a shoulder 34 thereon resting on the flange 35 from which the teeth 22 on the lower hub 23 are cut. With the two sections thus separately supported on their respective shafts alinement of the latter may be readily accomplished by the usual method of using a straight edge against the plane exterior surfaces of flanges 26 to indicate parallel alinement and parallel blocks and feeler gages at different points between said flanges for indicating angular alinement.

When the shafts are rotating, lubricant in the troughs 30 spreads in films on the inner surfaces of the sleeve sections thoroughly lubricating the various sets of teeth and the sleeve supporting bearing between shoulders 32, 33. However, it is desired that spreading of the lubricant film upwardly in the sleeves so as to build up the thickness of said film in the vicinity of the teeth. For this purpose, shoulders 33 and 34 are arranged within the sleeve at points in proximity to the teeth so that the lubricant cannot spread in a film throughout the length of the sleeve. Shoulders 33, 34, therefore, perform dual functions.

What I claim is:—

1. In a flexible coupling of the vertical type, the combination of a pair of vertically disposed shafts, a series of teeth carried by each shaft, a sleeve having teeth thereon engaging the teeth on said shafts to transmit motion from one shaft to the other, means immediately adjacent the teeth on each shaft for retaining a body of lubricant within the sleeve in proximity to said teeth, said body of lubricant in each retaining means being adapted to be spread by centrifugal force in a film on the inner surface of said sleeve when the shafts are rotated, and means for limiting the spreading of the film of lubricant longitudinally of the sleeve.

2. In a flexible coupling of the vertical type, the combination of a pair of vertically disposed shafts, a series of teeth carried by each shaft, a sleeve having teeth thereon engaging the teeth on said shafts to transmit motion from one shaft to the other, means immediately adjacent the teeth on each shaft for retaining a body of lubricant within the sleeve in proximity to said teeth, said body of lubricant in each retaining means being adapted to be spread by centrifugal force in a film on the inner surface of said sleeve when the shafts are rotated, and means for regulating the thickness of said film of lubricant.

3. In a flexible shaft coupling of the vertical type, the combination of upper and lower shafts, a series of teeth on each shaft, a coupling sleeve spaced radially from said shafts, rows of teeth on said sleeve meshing with the teeth on said shafts, and cooperating means carried by one of said shafts and said sleeve for flexibly supporting the sleeve on said shaft without binding action independently of said teeth.

4. In a flexible shaft coupling of the vertical type, the combination of upper and lower shafts, a series of teeth on each shaft, a coupling sleeve spaced radially from said shafts, rows of teeth on said sleeve meshing with the teeth on said shafts, the teeth on the shafts having curved crowns whereby the sleeve may rock thereon to compensate for misalinement of the shafts, and cooperating means carried by one of said shafts and said sleeve for flexibly supporting said sleeve independently of said teeth.

5. In a flexible shaft coupling of the vertical type, the combination of upper and lower shafts, a series of teeth on each shaft, a coupling sleeve, rows of teeth on said sleeve meshing with the teeth on said shafts, the teeth on the shafts having curved crowns whereby the sleeve may rock thereon to compensate for misalinement of the shafts and co-operating shoulders on one of said shafts and the sleeve for supporting the sleeve on said shaft, one of said shoulders having a curved surface whereby the sleeve will be flexibly supported on the shaft.

6. In a flexible shaft coupling of the vertical type, the combination of vertically disposed shafts, a series of teeth on each shaft, a coupling sleeve comprising two sections each provided with a series of teeth adapted to mesh with the teeth on said shafts, means for rigidly connecting said sleeve sections together, and means for separately supporting the sections of the sleeve on said shafts when the two sections are disconnected.

7. In a flexible shaft coupling of the vertical type, the combination of vertically disposed shafts, a series of teeth on each shaft, a coupling sleeve comprising two sections each provided with a series of teeth adapted to mesh with the teeth on said shafts, means for rigidly connecting said sleeve sections together, means for supporting one sleeve section on one shaft, and means for supporting the other sleeve section on the teeth of the other shaft when said sections are disconnected.

8. In a flexible shaft coupling of the vertical type, the combination of vertically disposed shafts, a series of teeth on each shaft, a coupling sleeve comprising two sections each provided with a series of teeth meshing with the teeth on said shafts, a lubricant reservoir within said sleeve for each set of meshing teeth the lubricant being adapted to be spread in a film on the wall of said sleeve by centrifugal force when said shafts are rotated, means for connecting said sleeve sections together, and means for separately supporting the sleeve sections on said shaft when said sections are disconnected, said supporting means also serving to confine said film of lubricant to the surface of said sleeve sections adjacent the co-operating teeth when the shafts are rotated.

MERTON W. MORGAN.